United States Patent [19]

Lemelson

[11] 4,110,801

[45] Aug. 29, 1978

[54] MAGNETIC TAPE TRANSDUCING APPARATUS

[76] Inventor: Jerome H. Lemelson, 85 Rector St., Metuchen, N.J. 08840

[21] Appl. No.: 856,914

[22] Filed: Dec. 2, 1977

Related U.S. Application Data

[60] Continuation of Ser. No. 474,974, May 31, 1974, abandoned, which is a continuation-in-part of Ser. No. 295,807, Oct. 10, 1972, Pat. No. 3,881,053, which is a continuation-in-part of Ser. No. 224,131, Feb. 7, 1972, Pat. No. 3,699,266, which is a continuation-in-part of Ser. No. 142,748, Aug. 28, 1961, Pat. No. 3,646,258, which is a division of Ser. No. 515,417, Jun. 14, 1955, Pat. No. 3,003,109.

[51] Int. Cl.² .................. G11B 5/54; G11B 23/08
[52] U.S. Cl. .................................. 360/96; 360/105
[58] Field of Search .................. 360/96, 105, 91–92, 360/93, 96, 88, 75

[56] References Cited

U.S. PATENT DOCUMENTS

| | | | |
|---|---|---|---|
| 2,637,560 | 5/1953 | Smith | 360/105 |
| 2,650,830 | 9/1953 | Potter | 360/105 |
| 2,821,576 | 1/1958 | Gaubert | 360/75 |
| 2,857,164 | 10/1958 | Camras | 360/93 |
| 2,918,656 | 12/1959 | Nolde et al. | 360/88 |

*Primary Examiner*—Alfred H. Eddleman

[57] ABSTRACT

An apparatus is provided which employs a cartridge or magazine containing an elongated length of record tape supported within said cartridge and adapted to be driven from a supply means to a take-up reel by the combined operation of power rotating the take-up reel and a plurality of cylindrical members supported adjacent the cartridge which engage and drive a portion of the tape therebetween to feed it to the take-up reel. Transducing and tape drive means is operable to simultaneously drive the tape between the supply means and the take-up reel and to effect the scanning of the tape and the transducing of information with respect to the tape as it is driven.

15 Claims, 5 Drawing Figures

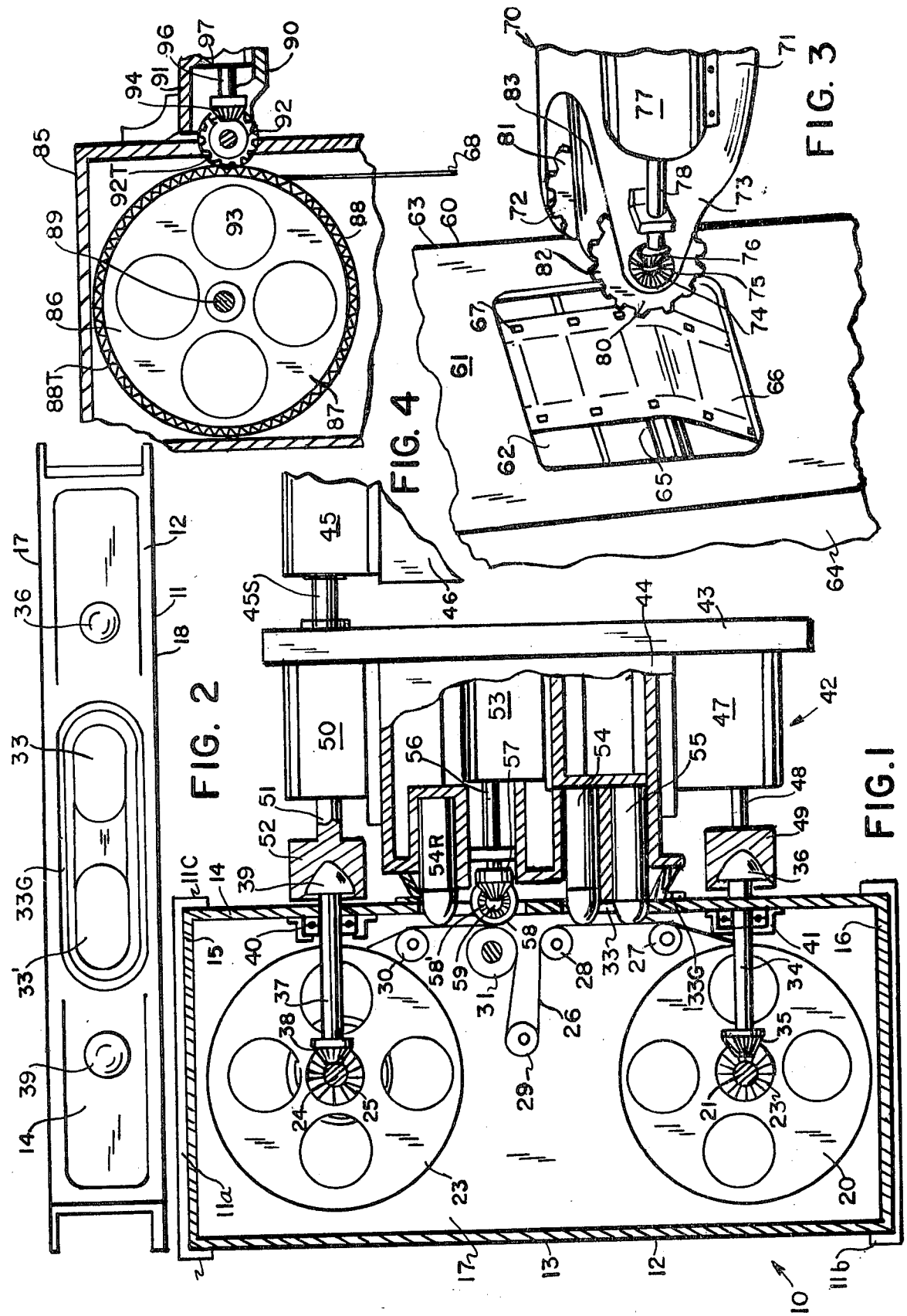

MAGNETIC TAPE TRANSDUCING APPARATUS

RELATED APPLICATIONS

This is a continuation of application Ser. No. 474,974 filed May 31, 1974, now abandoned, as a continuation-in-part of Ser. No. 295,807 filed Oct. 10, 1972, now U.S. Pat. No. 3,881,053, which was a continuation-in-part of Ser. No. 224,131 filed Feb. 7, 1972, now U.S. Pat. No. 3,699,266, filed as a continuation-in-part of Ser. No. 142,748 filed Aug. 28, 1961, now U.S. Pat. No. 3,646,258, which is a division of Ser. No. 515,417 filed June 14, 1955, now U.S. Pat. No. 3,003,109.

SUMMARY OF THE INVENTION

This invention relates to a storage, drive and transducing apparatus for elongated record members, such a magnetic recording tapes and the like, containing recordings of information along their lengths. The invention includes, in addition to a cartridge containing a flexible record member, such as a magnetic tape, means for removably supporting the cartridge with respect to a number of devices including a plurality of devices which are operable to drive the tape or filmstrip in the cartridge to permit the scanning of the tape and a transducer which is supported by a common mount therefor and the tape driving means. As a result, an apparatus is provided which may be easily utilized to scan and generate information signals relative to a plurality of cartridges wherein such cartridges are easily secured to and removed from the magnetic transducing or scanning apparatus. A plurality of such cartridges may be predeterminately arrayed in a holding fixture which includes means for coupling a power operated device to any one of such plurality of cartridges for driving the tape or filmstrip thereof past a reading station at which is located a simple transducer for reading the information or recordings provided along the length of the tape and generating electrical signals representative of said recordings.

Prior to the making of the instant invention, it was known in the art to provide mechanisms which involved separate operations for coupling to a record tape to permit the scanning and transducing of information recorded thereon and for mechanically engaging the tape to drive same past the scanning means. Such mechanisms were relatively complex in their operation or failed to provide suitable operation of the tape drive and transducing means. Furthermore, by providing separate tape transducing and drive means, the mechanism was not only complex in structure and operation, but frequently resulted in failure to properly effect a transducing operation while the tape was in motion.

Accordingly, it is a primary object of this invention to provide a new and improved tape drive and transducing apparatus.

Another object is to provide a tape transducing apparatus employing a magnetic tape or filmstrip supported within and guided by a mechanism including a housing or cartridge and a separate drive and transducing means for the tape of the cartridge.

Another object is to provide an improved tape cartridge transducing arrangement wherein the tape in the cartridge may be easily engageable by a drive wheel therefor while a transducer is positioned for scanning the information on the tape as it is driven.

Another object is to provide a simple mechanism for releasably receiving a cartridge containing a tape to be driven therein from a supply reel to a take-up reel wherein the drive means is associated with the mechanism to which the cartridge is coupled which mechanism includes a scanning means for the information on the tape which is brought into operative relation with the tape simultaneously as coupling is effected between the drive means and the tape whereby, in a single actuation of the mechanism, scanning may be initiated to derive the information from the tape.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a side view with parts broken away for clarity of a magnetic tape magazine or cartridge in operative relation to a combined transducing and drive means for the tape in the magazine;

FIG. 2 is an end view of the magazine of FIG. 1;

FIG. 3 is an isometric view of a modified form of the cartridge and driving arrangement illustrated in FIG. 1; and FIG. 4 is a side view with parts broken away for clarity of a portion of a tape cartridge and drive means for a reel thereof.

Figure 5:
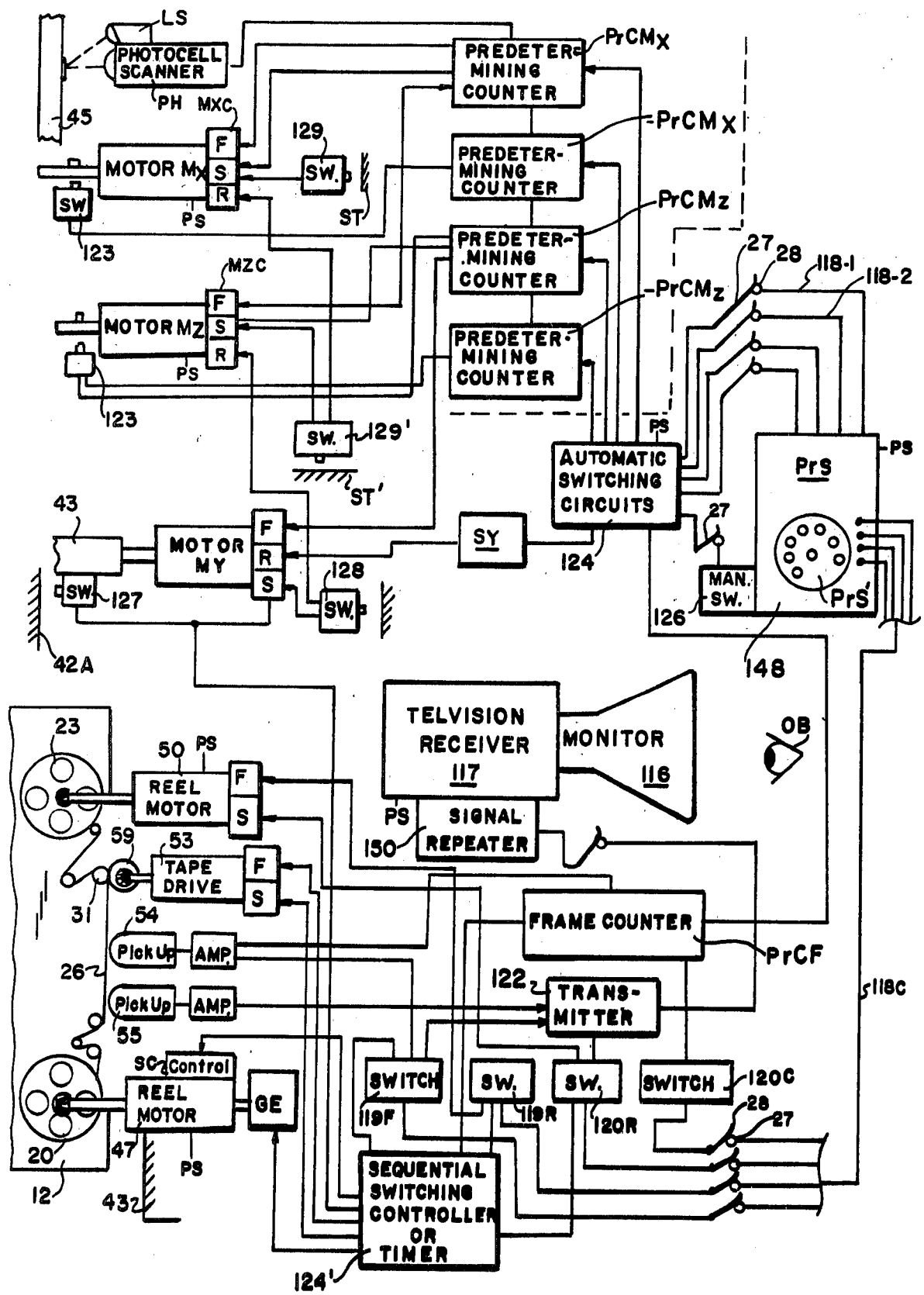
FIG. 5 is a schematic diagram illustrating a control system for controlling the operation of a modified form of the apparatus of FIGS. 1–2.

There is shown in FIGS. 1 and 2 a magnetic recording and reproduction apparatus 10 comprising a support 11 such as a housing or rack for prepositioning and holding a magazine 12 containing magnetic tape 26 supported and guided therein to travel between a supply reel 20 and a take-up reel 23 both of which are supported for rotation on shafts 22 and 24 by the side walls 17 and 18 of the magazine. The support 11 is shown having a plurality of guides 11a and 11a for predeterminately locating the upper and lower walls of the magazine 12 and a guide or stop 11a for longitudinally locating the magazine with respect to a transducing and driving assembly to be described. The magazine 12 is composed of end walls 13, 14, top and bottom walls 15, 16 and said side walls 17, and 18 and is substantially rectangular parallelpiped in shape. Magnetic tape 26 is guided by a plurality of wheels 27 to 31 which are rotationally supported by the side walls of the magazine housing in a path parallel and adjacent an opening 33 in the end wall 14.

Upon prepositioning or securing the magazine 12 on the support 11, a transducing and tape driving assembly 42 is operated to bring one or more transducers into operative engagement with the tape and driving means to engage the tape and reel driving means. Shown extending through openings in end-wall 14 and rotatably supported by bearings 40, 41 supported by said end-wall and by bearings (not shown) supported by the side-wall 18, are respective shafts 34 and 37 containing bevel gears 35 and 38 which engage and mesh with bevel gears 23 and 25 supported by the shafts 21 and 24 which support reels 20 and 23. The latter shafts are rotatably supported by the side walls of the magazine 12. Secured to the other ends of shafts 34 and 37 are respective conical coupling members 36 and 39 which serve as means for coupling respective drive means to the shafts.

The tape drive and transducing assembly 42 is composed of a mount 43 which contains a plurality of magnetic heads or transducers 54, 54R and 55 and rotationally supports a drive wheel 58 for the tape preferably fixed thereon in alignment with each other and movable together on the common mount 43 so as to simultaneously engage the tape located adjacent the opening 33 in end wall 14. Also shown supported by support or mount 43 are respective motor operated drive units 47 and 50 which contain respective coupling devices 49 and 52 supported at the ends of their drive shafts 48 and 51 and located to engage the shaped coupling members 36 and 39 at the ends of shafts 34 and 37 when the assembly 42 is operatively located, as shown, with respect to the magazine 12. Drive motor 50 is operable to drive the take-up reel 23 to take up tape as it is fed by the driving action of drive wheel 58 engaging the tape against wheel 31. The drive unit or motor 50 preferably contains a slip clutch or tension responsive means to draw the tape onto reel 23 without driving it from between wheels 31 and 58 or overstretching same.

A third reversible motor 53 is a constant speed motor which is also supported by mount 43 and has a bevel gear 57 secured to the end of its output shaft 56 which gear engages the teeth of a second bevel gear 58' secured to a shaft 59 which is supported in bearing by the housing 44 enclosing the assembly 42. Shaft 59 supports the tape drive wheel or capstan wheel 58 which is driven in rotation by motor 53 and is located in mount 43 so as to engage the tape 26 against a wheel 31 which is supported in rotation by the side wall of the magazine behind the tape and serves as a depressor wheel permitting the capstan wheel to drive the tape in either direction past the heads. When tape 26 is driven from reel 20 to reel 23, constant speed motor 53 is operable to rotate wheel 58 clockwise and the motor of unit 50 is energized to drive reel 23 to wind the tape thereon while reel 20 is permitted to freely pay out tape by deactivating drive 47. To drive the tape 26 onto reel 20, motor 47 is operated while motor 50 is rendered inoperable with its output shaft 51 free to turn so that reel 23 may supply tape to reel 20. Notation 33G refers to a flanged member secured to the end wall 14 of the housing of the magazine or cartridge 12 for receiving and guiding the end of the transducer and drive assembly 42 through the openings 33 and 33' in the end wall 14 to permit the transducers and wheel 58 to engage the tape 26 therein. A lineal actuator 45 such as a bi-stable solenoid or motor has its shaft 45S secured to mount 43 and is supported on a mount or base 46 which is either fixed with respect to the support 11 for the cartridge or is movable in a direction lateral or transverse to the cartridge and a plurality of similar cartridges or magazines disposed in side-by-side array by racking or other means as provided, for example, in parent application Ser. No. 295,807. Movement of the mount 46 and or the array of cartridges may be automatically controlled to bring the assembly 42 into alignment with a selected cartridge to position the magnetic transducers thereof in operative alignment with the tape of a selected cartridge after which the actuator 45 may be operated to project the assembly 42 towards the selected cartridge and cause the heads and the cylindrical wheel 58 to engage the tape as shown in FIG. 1. In such operative relation, magnetic reproduction head 54R passes through opening 33' in end wall 14 while the magnetic erase and recording heads 54 and 55 extend through opening 33 to engage different portions of the tape 26 which extend parallel to the wall 14, while the drive wheel 58 is positioned against the stationary or spring loaded depressor wheel 31.

In FIG. 3 is shown a modified form of the invention wherein the tape is provided with border openings therein for driving purposes. A tape cartridge is provided, denote 60, having the general configuration of the magazine of FIGS. 1 and 2 and is removably supported on a mount (not shown) adjacent a tape drive and transducing assembly 70 which is longitudinally movable, as described, towards and away from the end wall 61 of the cartridge and an opening 62 therein. Cartridge 60 contains parallel side walls 63 and 64 and is adapted to be removable secured to a mount which may or may not also support assembly 70, and a plurality of similar cartridges in side-by-side array. Guided for longitudinal movement past opening 62 in end wall 61 is a magnetic tape or filmstrip 66 having equispaced holes 67 in either or both borders thereof. Rotatably supported by the cartridge walls or the support on which the cartridge is mounted, is a resilient cylindrical member or roller 65. A scanning transducer 82, such as a magnetic head or television camera, is supported at the end of assembly 70 between spaced apart extensions 72 and 73 of the housing 71 for the assembly, which extensions support bearings for rotatably supporting a shaft 74 at the ends of which shaft is supported respective toothed drive wheels 80 and 81 for the perforated tape 66 in the cartridge 60. Secured to an end of shaft 74 is a bevel gear 75 which meshes with a second bevel gear 76 supported at the end of a shaft 78 of a reversible gear motor 77 secured to the housing 71. Thus when motor 77 operates in either direction, the toothed wheels 80 and 81 will simultaneously rotate and may be employed, when engaging the openings in the filmstrip 66, to drive the filmstrip past the opening 62 for scanning by the transducer supported therebetween. The wheels 80 and 81 and the transducer 8 are so located on mount 70 that when said mount is aligned with and is advanced towards the opening 62 in wall 61 of the cartridge 60, the teeth 8 of the wheels 80 and 81 will engage the holes 67 in the tape and will cooperate with backing roller 62 in driving the tape teeth of the wheels 80 and 81 may engage the roller 65 which may be made of a resilient material and may thereby positively drive the tape 66 in the direction in which the wheels are driven by motor 77 as the scanning device 82 scans information recorded along the length of the tape.

The tape 66 may comprise an elongated strip of magnetic recording tape or filmstrip containing frames 68 of picture information such as motion picture frames.

In FIG. 4 is shown a modified form of the invention wherein means are provided for coupling a drive means directly to the periphery of a reel of tape located within a cartridge or magazine denoted 85. The reel 86 is rotatably supported on a shaft 89, the ends of which are supported in bearing by the side walls of the cartridge 85. The reel 86 is composed of a plurality of disc-shaped side walls, one of which, denoted 87, is illustrated, and has it periphery 88 formed with a plurality of teeth 88T therein which are adapted to be engaged by the teeth 92T of a device 90 which is supported by a mount such as mounts 43 or 70 containing the transducing or scanning means described, in a path to position a power operated sprocket wheel 92 through an opening 85H in the end wall of the housing 85, as illustrated. Sprocket wheel 92 contains peripheral teeth 92T and a bevel gear 93 which is coupled to a second bevel gear 94 on the output shaft 96 of a reversible gear motor 97 supported within the housing 91 of the mount 90. Thus, when the teeth 92T of the bevel gear 92 mesh with the teeth 88T in the peripheral surface of the reel member 86, the reel may be driven in the desired direction to take up or release tape 66 therefrom.

It is noted that the several mechanisms illustrated in the drawings may be interchanged with one another to provide mechanism combinations which come within the purview of the instant invention. Modifications may also be made to the tape transducing and driving arrangements illustrated without departing from the instant invention.

It is noted that the support on which the assembly 42 of transducers and drive means for the tape of the cartridge (e.g. the mount 46 on which the actuator 45 is supported) may be movable in a direction which is transverse to side walls of the cartridge to bring the transducers and coupling means thereof into alignment with other cartridges which may be disposed at either or both sides of the cartridge illustrated in FIG. 1 so that transducing may be effected with respect to a selected of a plurality of tapes disposed in different cartridges. Conversely, the mount 46 may also be fixed on a base or support while cartridges of the type illustrated in FIG. 1 are selectively brought into operative alignment with the transducer supported fixedly supported on a mount and are selectively coupled to the tape drive and transducing means of the mount.

It is also noted that the transverse relative movement between mount 46 and the record tape cartridge may also be effected by rotating either or both said mount and the retainer for the cartridge about a rotational or pivotal axis.

Further details of a control system for controlling the various motors and transducers provided in the apparatus of FIGS. 1 - 4 may be derived from parent application Ser. No. 224,131 now U.S. Pat. No. 3,699,266 and Ser. No. 142,748, now U.S. Pat. No. 3,646,258.

FIG. 5 is a schematic diagram illustrating a control system for controlling the operation of a modified form of the apparatus of FIGS. 1 and 2 which employs a plurality of tape cartridges or magazines and includes means for selectively reproducing information from selected of the tapes of the magazines. The control system shown in FIG. 5 automatically controls the operation of a plurality of servomotors employed to selectively drive the mount supporting the magnetic tape transducers and the drive means for the tape of a selected cartridge to selectively position the mount and transducers thereof in alignment with a selected of a plurality of cartridges supported adjacent each other on a rack or other support, effect coupling between the motors supported by the mount and the tape and cartridge reels and selectively drive the selected tape to bring a selected portion or portions thereof into transducing relation with respect to the transducers supported by the mount. The particular apparatus of FIG. 5 may be employed to reproduce video signals from video picture signal recordings thereof on the magnetic tapes of a plurality of magnetic tape cartridges of the types shown in FIGS. 1 and 2.

As hereinabove set forth, a plurality of magnetic tape cartridges are provided in the system of FIG. 5 which are supported in a side-by-side array or arrays thereof and held wherein such side-by-side arrays may also be vertically supported by an assembly of beams or structural elements which define racking 145 which is fixed with respect to a mount for the tape drive and transducing apparatus which is of the type denoted 46 in FIG. 1. Said mount is movable along a guideway and controllably driven horizontally in a path lateral to the side-by-side rack supported array of cartridges by a first motor MX and vertically on a vertical fixture as defined in U.S. Pat. No. 3,699,266 and in copending application Ser. No. 295,807 by a second motor MZ to bring it into operative alignment with a magnetic tape of a selected cartridge.

In FIG. 5 notation 148 refers to a control panel having manually operated automatic selection controls denoted PrS, which includes a rotary selection switch PrS' of the type used in automatic telephone circuit selection. Other manually operated controls are also provided to effect further automatic control of the apparatus operative to sequentially control the various servomotors and thereby position the pickup opposite a selected tape containing magazine and to further control the movement of the tape therein. The control panel 148 is connected by wires 118 to transmit control signals or pulses along conducting lines 128a, 128b, 128c, etc. Notation 124 refers to a receiver for amplifying and transmitting the control signals to predetermining counters denoted PrCMX, PrCMY, etc., which are operative for effecting control of the motors and other devices described for effecting controlled movement of the mount 46 and its conveying apparatus. The receiver 124 contains automatic switching means for distributing the pulses transmitted from rotary switch PrS to the corresponding predetermining counting devices.

A first predetermining counting device PrCMX controls operation of the servomotor MX and a second counter PrCMZ controls operation of motor MZ. Control is effected by transmitting a first pulse to the forward drive starting control of the particular servomotor and the transmission therefrom of position-indicating pulses generated so the conveying apparatus is driven to uncount each of the preset predetermining counters. The uncounting pulses are generated either by a switch 123 actuated by rotation of the particular motor shaft or by a limit switch. The switch generated pulses are transmitted to uncount the preset predetermining counters. Upon uncounting, a particular preset counter generates a control pulse which is transmitted to energize a particular control or relay such as one defining the stop control of the particular motor controlled thereby. The motor start and stop controls are denoted F and S, and notations R refer to the reverse drive controls for the motors. A second pulse, generated simultaneously with the first pulse, is effective to stop one motor and energize a relay in the start control F of the next motor thus starting same and a third pulse closes a circuit between the motor shaft actuated switch 123 for the next motor and the next control counter thus effecting automatic positional control in discrete steps.

Controlled drive of the recording medium or tape 68 of the selected magazine is effected by controlling the operation of motors 50, 47 and tape or filmstrip drive motor 53. These motors are controlled in their rotation either by forward and reverse switching controls forming part of control panel 148 and manually operated by the observer denoted OB who monitors a viewing screen 116 or by predetermining selection control means activated by properly operating the rotary switch PrS' which presets a predetermining counting control device PrCF operative to control either the tape reel motors and/or the tape driving motor MT by utilizing position indicating feedback pulses generated by reproducing frame-indicating pulses from the tape by means of the pickup for the frame-indicating pulses.

The blocks denoted PS refer to power supply means which are connected to operate various power operated electrical devices forming part of the control system whether such power supplies are shown or not. Notations S relate to position-indicating stops located to actuate limit switches projecting from certain of the movable conveying components operative to affect stoppage of a particular motor driving one component when it arrives at the stop and to simultaneously effect the starting of another motor driving a second component to effect a steplike control sequence. Control of the various servos of the invention may be attained by the feedback of position-indicating pulses or signals to uncount preset counting devices by activating position-indicating switching means to indicate the movement of the carriage assemblies of apparatus to predetermined locations.

FIG. 5 provides control means whereby an observer at a remote monitor station may effect control of the motion of mount 43 from a first, or at rest position into alignment with a selected tape cartridge magazine by dialing a rotary selection switch PrS, which switch is operative to preset selection devices to automatically effect the control of the motion of the mount 43 to any selected information magazine and effect the further operations necessary to position said pickup head for deriving information therefrom. If the system employs video recordings on the tapes which may be used to modulate image generating means such as cathode ray tube write beams, the observer OB faces a viewing screen illustrated as a television picture tube and effects the reproduction of information from selected magazines as visual images on the television viewing screen thereof.

FIG. 5 illustrates means for deriving information from a selected magnetic tape having video signals recorded thereon which are reproducible as still images on the screen of a television receiver tube.

Manual selection means is provided to control the operation of the pickup head conveying apparatus so that it may couple to a selected magazine and will be positioned to derive information therefrom. Selection of a magazine for scanning is effected by a dial operating rotary stepping switch PrS' to cause said switch to generate and transmit pulse signals to predetermining counters or decades of counting relay banks which are predeterminately set up or programmed by the pulse trains generated by rotary switch PrS'.

Command control of the apparatus is effected in one of a number of manners such as by generating feedback pulses as the servomotors MX, MY, MZ, MT operate, a selected number of which pulses define a predetermined number of rotations of a particular motor indicating, for example, that the motor MX has driven the conveyor to a position opposite a selected information storage unit. The feedback control pulses may be generated by limit switches 123 actuated by rotation of each motor shaft or drive mechanisms associated therewith, or by means of a photoelectric switch which is actuated with movement of the conveying apparatus along its track. A photoelectric cell PH is employed to scan the storage racking and is activated by marks or reflectors RE positioned at each tape magazine storage location. The photoelectric cell may thus be used to generate position-indicating pulses. A limit switch may also be actuated as the conveying apparatus moves with respect to the racking. The generated pulses are then transmitted to the counting banks which they serve to uncount, thereby effecting positional control of the mount 43 by generating control pulses upon uncounting and thereby energizing and deenergizing the various devices or motors described.

The control of the conveying apparatus driving the reproduction apparatus to a selected information magazine may be effected as follows: Each information storage unit or magazine is numerically classified. There will be, for example, 10 rows of magazines stacked one above the other, each row having 100 individual magazines laterally adjacent to each other. The storage system is thus provided with 1,000 information storage units each of which contains a large number of individual frames or document recordings. The magazines may also each contain motion picture film which is projectable as a motion picture remotely from the storage area.

If the magazines denoted 1 to 100 are located in a first row, 101 to 200 in a second row, etc., and it is desired to view the information found in a magazine classified as number 50, the dial switch PrS' is operated to generate such number as pulse trains. The first three pulses generated set up counter PrCMZ which controls the movement of the mount 46 containing tape magnetic transducers and tape drive means described in the vertical direction by controlling operation of the motor MZ to drive mount 43 so that its magnetic head is positioned opposite the selected row of magazines. The next number 50 which is dialed, presets counter PrCMx to count out with the receipt of 50 pulses from the switch 123 as the head moves from a home position past 50 magazines to a position where it is in alignment with the 50th magazine in the selected first row providing suitable gear means, the limit switch 123 may be actuated with each rotation of the motor each time a pin on the output shaft of said motor engages said switch and the switch generates uncounting pulses which are fed to the respective counters and are an indication of the movement of the conveying apparatus. Upon receipt fo the 50th pulse from the switch actuated by motor MX, counter PrCMX uncounts and pulses stop control S of motor MX, effecting the stoppage of said motor in a predetermined manner such that the mount 46 is in alignment with the desired magazine.

FIG. 5 defines means, such as provided in FIG. 1, for driving the record tape past the pickup heads. The tape drive comprises a capstan drive wheel 59, driven by a motor 53 and engaging the selected tape 26 against a stationary or spring-loaded depressor wheel 31. Tape takeup is effected by operating motor 47 at a controlled speed.

Notation 124' relates to automatic means for effecting control of the tape drive motors 50, 47 and 53 for maintaining constant tension on the tape 26 while it is being driven so that the reproduced signal will not be distorted and the tape will not stretch or break. The maintenance of constant tension may be accomplished by driving a generator GE connected to the shaft of motor 47 and using the medium of feedback to control the generator load to define a constant tension load. The feedback control components are contained in the control device 124'. As this type of feedback motor control is known to the art, it will not be described. A controller SC for the reel drive motor 47 contains both speed and on-off controls which are energized by relays energized by pulses generated by control device 124'. Device 124' is a relay actuated controller operative to receive signals from any of the control devices 119, 120 or counter PrCF and to channel such control pulses to controls for the motors 50, 47 and 53 so as to effect controlled forward or reverse movement of the record tape.

A predetermining frame counter PrCF effects frame selection control by uncounting upon receiving frame position-indicating pusles reproduced by an auxiliary reproduction head PU' and recorded on a channel of the tape 26 other than the video picture signal recording channel. The frame signal pulses reproduced by head 54 are amplified in a reproduction amplifier PU'-RA and are fed to frame counter PrCF as the tape 26 moves. Upon arrival of the selected frame at head 55, the signal on the selected frame is reproduced by reproduction head 55, amplified in a reproduction amplifier PU-RA and passed to a video signal transmitter 122. Counter PrCF is preset by manually operating rotary switch PrS'. When the reproduction head is located for reproducing signals from the tape 26, the starting control F of motor MT and the controls for motor MR-2 are activated by a limit switch 127' which is actuated by advancement of the scanning heads into operative position to initiate drive of the tape 26 past the reproduction heads. Upon uncounting, the counter PrCF activates the reproduction head 55 to effect reproduction of the selected signals recorded on tape 26. A pulse transmitted to transmitter 122 effects transmission of the selected signals to the remote receiving apparatus. Another simultaneously generated control pulse effects control of the tape-driving motors to stop the tape after the selected frame recording has passed the reproduction heads. The control 124' may contain means operative upon receipt of a pulse from counter PrCF for stopping motors 47 and 53 and starting motor 50 to drive the tape in reverse to either rewind the tape onto reel 23 or drive the tape a degree such that the frame immediately following the frame just reproduced from may be scanned next by operating frame selection control 119F.

Notations 119F, 119R, 120F and 120R refer to manually actuated switches and controls mounted on control panel 148 which are electrically connected through wires 118C and the overhead wiring system to control components 119'F, 119'R, 120'F and 120'R mounted on the conveying apparatus. The control 119F effects forward drive of the tape 26 a degree such that the frame following the one containing information just monitored will pass the pickup heads and the signal recorded will be automatically reproduced and transmitted to the monitoring apparatus which includes a video receiver 117, picture tube 116 and other picture storage apparatus.

Operation of the means illustrated in FIG. 5 for selectively controlling the apparatus, may be described as follows: The observer requires access to stored information, dials selection switch PrS' according to the code denoting a selected magazine to be searched for information and he operates the dial switch to effect driving of the selected tape therein to position a selected frame for scanning. The predetermining counters PrCMX, PrCMY and PrCF are thereby set up or preset and are operative to effect a desired control sequence by uncounting with the receipt of feedback pulses to effect positional control of the conveying apparatus by controlling the motors driving the conveying apparatus from a starting position defined by a stop such as stop ST preferably located at a home location on the X directional trackway. Such feedback signal pulses are generated by counting motor shaft rotations or by scanning means activated as the apparatus passes predetermined positions located throughout the storage area. When so preset, counter PrCMX generates a first pulse which is applied to the starting control F of motor MX and starts the motor. Upon uncounting, counter PrCMX generates a pulse which is applied to the stop control S of motor MX effecting its stoppage and simultaneously generates a pulse at the start control F of motor MZ. While counter PrCMX counts down, a second counter PrCMX may operate to total the pulses received by PrCMX and may be used to control the return travel of the conveying apparatus to its starting position or to constantly monitor and determine the position of the conveying apparatus relative to its starting position. Motor MZ then drives the mount 43 from a first position ST' to the vertical location of the selected magazine at which location the counter PrCMZ counts out and sends a pulse to the stop control S of motor MZ and a second pulse to the starting control F of motor MY. Motor MY then operates to project the pickup head 55 to an operative position with respect to or against the selected magazine housing so that the motors 50, 47 and 53 are respectively coupled to their magazine driving fittings, the pickup or scanning means is aligned with or against the tape and the motor 53 is in position to effect driving the tape past the scanning apparatus. If counter PrCF is employed to locate a selected frame of the tape for scanning, then tape drive motor 53 and 47 are automatically started by a pulse from the limit switch 127 which is actuated when it contacts the front wall of the selected magazine 12. Limit switch 127 thus operates to stop motor MY with the head and apparatus engaged against or aligned with the selected magazine and the tape drive means of the conveyor coupled to the magazine input shafts. Counter PrCF controls the drive of the tape as described and controls 119 and 120 may also be employed to effect further control of tape movement in the act of searching for information recorded on said tape. The tape may be automatically driven to its starting position by sustained closure of the panel switch 120R. When the observer has finished searching information recorded on the selected tape, he may effect return of the conveying apparatus to a starting position by actuating a switch 126, sending a pulse to a holding relay SY which bypasses switch 127 and reverses the motor or solenoid 45 withdrawing mount 43 from the selected magazine.

I claim:

1. A tape transport apparatus comprising in combination:

a cartridge containing record tape, a first support, means for receiving and predeterminately locating said cartridge on said first support, said cartridge having a supply means for flexible record tape containing information recorded along its length and a take-up reel for receiving and winding tape fed thereto from said supply means, means for guiding said tape in a predetermined path in said cartridge which path defines a free length of said tape within said cartridge, said cartridge having a wall portion with an opening therein aligned with at least a portion of said free length of said tape in said cartridge, means for rotationally supporting said take-up reel in said cartridge, a first cylindrical member rotationally supported behind said free length of tape and aligned with said opening in said cartridge wall, a second support, transducing means supported by said second support and operable for generating electrical signals representative of recordings on said tape when operatively positioned with respect to said tape and scanning said tape, a second cylindrical member rotationally supported on said second support adjacent said transducing means, first means for effecting first predetermined relative movement between said second support and said first support in a first direction when said cartridge is predeterminately located on said first support to first cause said end wall of said cartridge containing said opening to be aligned with said transducing means, and second means for effecting further relative movement between said cartridge and said transducing means in a second direction to bring said transducing means and cartridge into operative relation wherein that portion of said tape aligned with said opening in said cartridge wall will be operatively disposed with respect to said second cylindrical member for engaging said tape against said first cylindrical member, motor means operable for power rotating one of said first and second cylindrical members while said tape is engaged therebetween to drive said tape towards said take-up reel, drive means for said take-up reel, coupling means connected to said take-up reel drive means for connecting said drive means to drive said reel, means for effecting relative movement between at least part of said coupling means and a cartridge when said cartridge is predeterminately disposed on said first support to cause said coupling means to become operatively engaged for driving said take-up reel, and third means for simultaneously operating said motor means to effect the driving movement of said tape and said take-up reel drive means to rotate said take-up reel and to thereby operate for taking up tape fed thereto.

2. A tape transport apparatus in accordance with claim 1 wherein said tape comprises a magnetic tape and said transducing means supported by said second support comprises a plurality of magnetic transducers supported in lateral alignment on said second support in locations such that, when said transducing means is in operative relationship with respect to that portion of said tape aligned with said opening in said cartridge wall, each of said plurality of transducers will engage a different portion of the length of said tape aligned with said opening in said wall portion of said cartridge.

3. A tape transport apparatus in accordance with claim 2 wherein said transducing means includes a magnetic recording transducer and a magnetic reproduction transducer both of which are simultaneously engaged with respective portions of said tape when said transducing means is in operative relation with said tape, said transducers each being selectively energizable to permit said transducing means to perform either recording or reproduction operations of said tape.

4. A tape transport apparatus in accordance with claim 1 wherein at least a portion of said coupling means and said drive means for said take-up reel are supported by said second support.

5. A tape transport apparatus in accordance with claim 1 including a hub rotatably supporting said take-up reel within said cartridge, said coupling means including circular tooth means connected to said hub of said take-up reel and a shaft containing a toothed member connected to said drive means for said take-up reel and adapted to mesh with the teeth of said tooth means of said hub when coupling means and cartridge are predeterminately disposed and in driving operative engagement with each other.

6. A tape transport apparatus in accordance with claim 1 wherein said first and second directions of relative movement between said cartridge and said transducing means are substantially transverse to each other.

7. A tape transport apparatus in accordance with claim 1 wherein said means for effecting relative movement between said cartridge and said transducing means comprises an electrically operated servo device.

8. A tape transport apparatus in accordance with claim 2 wherein said plurality of magnetic transducers are operable for selectively reproducing, recording and erasing signals along the length of said tape while said tape is driven within said cartridge and are disposed in direct lateral alignment with each other, said plurality of transducers being adapted to simultaneously engage respective longitudinal portions of said tape when said further relative movement is effected between said cartridge and said transducing means.

9. A tape transport apparatus comprising in combination:

a cartridge having a housing containing record tape, a first support, means for receiving and predeterminately locating said cartridge on said first support, said cartridge having a supply means for flexible record tape containing information recorded along its length and a rotatable take-up means for receiving and winding tape fed thereto from said supply means, said cartridge housing having substantially parallel side walls supported and held apart by opposed end walls, means for guiding said tape in a predetermined path within said cartridge which path defines a free length of said tape extending directly behind an end wall of said cartridge, said end wall of said cartridge behind which said free length of tape extends having a plurality of openings therein each of which openings is provided along a different portion of said end wall and exposes a different portion of said free length of tape, a hub supporting said take-up reel in said cartridge, a first cylindrical member supported for rotation behind said free length of tape in said cartridge in alignment with one of said openings in said cartridge wall, a second support operable to be linearly moved towards and away from a cartridge which is predeterminately located on said first support, transducing means supported by said second support and operable for generating electrical signals representative of the recordings on said tape when operatively scanning said tape, a second cyclindrical member rotatably supported by said second support and located adjacent to said transducing means on said second support, means for effecting predetermined relative movement in a first direction between said second support and a cartridge when said cartridge is predeterminately located on said first support to insert said transducing means through a first of said plurality of openings in said end wall of said cartridge and to bring said transducing means into operative relation with that portion of said tape aligned with said first opening in said cartridge wall and further to simultaneously insert said second cylindrical member through a second of said plurality of openings in said cartridge wall and dispose at least a portion of said second cylindrical member within said cartridge in engagement with that portion of said tape which is directly aligned with said first cylindrical member so as to engage said tape between said fist and said second cylindrical members, motor means operable for power rotating one of said first and second cylindrical members while said tape is engaged therebetween to effect the driving of said tape towards said take-up reel, drive means for said take-up reel, first coupling means connected to said take-up reel drive means for coupling said drive means for drivingly connecting said drive means to said hub of said take-up reel, motor means for operatively connecting said coupling means to connect said drive means to said take-up reel prior to effecting a transducing operation when said cartridge is first disposed on said first support to permit the take-up reel to be rotatably driven by said drive means, and control means for simultaneously operating said motor means for rotating said one of said first and second cylindrical members and said take-up reel drive means to effect the driving movement of said tape and said reel drive means to take up tape fed thereto.

10. A tape transport apparatus comprising in combination:

a cartridge containing record tape, a first support, means for receiving and predeterminately locating said cartridge on said first support, said cartridge having a supply means for flexible record tape containing information recorded along its length and a take-up reel for receiving and winding tape fed thereto from said supply means, means for guiding said tape in a predetermined path in said cartridge which path defines a free length of said tape within said cartridge, said cartridge having a wall portion with an opening therein aligned with at least a portion of said free length of said tape in said cartridge, means for rotationally supporting said take-up reel in said cartridge, a second support, transducing means supported by said second support and operable for generating electrical signals representative of the recordings on said tape when said transducing means is operatively positioned with respect to said tape and is scanning said tape, tape drive means including a rotatable member supported for rotation on said second support adjacent said transducing means and movable with said transducing means, means for effecting first predetermined relative movement between said second support and said first support in a first direction when said cartridge is predeterminately located on said first support to first bring said end wall of said cartridge containing said opening into alignment with said transducing means and means for effecting relative movement between said cartridge and said first support in a second direction to move said transducing means and said rotatable member towards said cartridge and to simultaneously engage said rotatable member against said tape and dispose said transducing means in operative relation with that portion of said tape aligned with said opening in said cartridge wall, motor means operable when said rotatable member is engaged with said tape and connected thereto for power driving said tape towards said take-up reel, drive means for said take-up reel, coupling means connected to said take-up reel drive means for connecting said drive means to drive said reel, means for effecting relative movement between at least part of said coupling means and a cartridge when said cartridge is predeterminately disposed on said first support to cause said coupling means to become operatively engaged for driving said take-up reel, and means for simultaneously operating said motor means to effect the driving movement of said tape and said reel drive means to take up tape fed thereto.

11. A tape transport apparatus comprising in combination:

a cartridge containing record tape, a first support, means for receiving and predeterminately locating said cartridge at a first location on said first support, said cartridge having a supply reel for flexible magnetic record tape containing information recorded along its length and a take-up reel for receiving and winding tape fed thereto from said supply reel, means for rotationally supporting said supply and take-up reels in said cartridge, first and second coupling means for said supply and take-up reels accessible to the exterior of said cartridge, means for guiding said tape between said supply and take-up reels in a predetermined path within said cartridge which path defines a free length of said tape between said supply and take-up reels, said cartridge having a wall portion with an opening therein aligned with at least a portion of said free length of said tape in said cartridge, said opening exposing said portion of tape to the exterior of said cartridge, a first cylindrical member rotationally supported by said first support, a second support, transducing means supported by said second support for reproducing recordings from said tape when operatively coupled to said tape and scanning said tape, a second cylindrical member supported for rotation adjacent said transducing means, first means for effecting lateral movement between said second support and said cartridge in a first direction when said cartridge is predeterminately located at said first location on said first support to first bring said end wall of said cartridge containing said opening and said transducing means into relative alignment and second means for effecting further relative movement between the tape of said cartridge and said transducing means in a second direction to cause said transducing means and tape to be operatively coupled so as to permit transducing operations to be performed by said transducing means with respect to said tape, motor means operable for rotating one of said first and second cylindrical members while said tape is engaged therebetween to drive said tape towards said take-up reel, first and second drive means for said supply and take-up reels, third and fourth coupling means connected to said first and second drive means and located to become operatively coupled to respective of said first and second coupling means at the termination of said futher relative movement between said cartridge and said transducing means in said second direction so as to operatively connect said drive means to permit the selective powered rotation of said supply and take-up reels, and means for simultaneously power operating said second drive means and said drive means for said take-up reel so as to drive said tape towards said take-up reel and take up the driven tape onto said reel to permit said transducing means to scan said tape as said tape is driven past said transducing means.

12. A method of transducing signals recorded on magnetic tape extending between a supply reel and a take-up reel which reels are rotationally supported within a cartridge wherein access is effected through an opening in the cartridge and wherein the reels thereof have respective hub portions and coupling means for said hub portions which are respectively accessible to the exterior of the cartridge, said method comprising:

disposing said magnetic tape containing cartridge at a first location out of operable alignment with a transducing means, effecting relative lateral movement between said tape and said cartridge in a first direction to bring the tape of the cartridge into lateral alignment with said transducing means and to simultaneously bring the outputs of first and second drive means into operative engagement with said respective coupling means for said supply and take-up reels to permit said first and second drive means to respectively drive said first and second take-up reels, relatively moving said cartridge and said transducing means in a second direction and bringing the tape of said cartridge and said transducing means into operative relation to permit the transducing means to reproduce signals recorded on said tape, engaging first and second cylindrical members aligned with each other against opposite sides of said tape to pinch the tape therebetween and power rotating one of said cylindrical members to drive said tape past said transducing means toward said take-up reel, and simultaneously driving said take-up reel to take up the tape while energizing said transducing means to reproduce signals from said tape as it is driven past said transducing means.

13. A method in accordance with claim 12 wherein said relative movement between said cartridge and said transducing means is effected by laterally shifting said cartridge with respect to said first location.

14. A method in accordance with claim 12 wherein said relative movement between said cartridge and said transducing means is effected by laterally shifting said transducing means with respect to said first location.

15. A method in accordance with claim 12 wherein said relative movement between said cartridge and said transducing means is effected by means of an electrically operated motor.

* * * * *